(12) United States Patent
Chou

(10) Patent No.: US 7,782,401 B1
(45) Date of Patent: Aug. 24, 2010

(54) METHOD AND SYSTEM FOR DIGITAL IMAGE SCALING WITH SHARPNESS ENHANCEMENT AND TRANSIENT IMPROVEMENT

(75) Inventor: Chih-Hsien Chou, San Jose, CA (US)

(73) Assignee: Kolorific, Inc., Milpitas, CA (US)

( * ) Notice: Subject to any disclaimer, the term of this patent is extended or adjusted under 35 U.S.C. 154(b) by 1100 days.

(21) Appl. No.: 11/425,192

(22) Filed: Jun. 20, 2006

(51) Int. Cl.
*H04N 9/74* (2006.01)
*H04N 5/21* (2006.01)

(52) U.S. Cl. .................................. 348/581; 348/625

(58) Field of Classification Search ............... 348/581, 348/441, 458, 625, 618, 606, 607; 382/266, 382/298; 345/611, 660
See application file for complete search history.

(56) References Cited

U.S. PATENT DOCUMENTS

| | | | |
|---|---|---|---|
| 4,316,215 A | 2/1982 | Yasumoto et al. | |
| 4,789,890 A * | 12/1988 | Itoh et al. | 348/668 |
| 4,935,806 A | 6/1990 | Rabii | |
| 5,237,414 A | 8/1993 | Faroudja | |
| 5,635,991 A | 6/1997 | Kim | |
| 5,799,111 A * | 8/1998 | Guissin | 382/254 |
| 5,809,192 A * | 9/1998 | Manning et al. | 385/78 |
| 5,920,357 A | 7/1999 | Ohara | |
| 6,690,429 B1 | 2/2004 | Kim | |
| 7,408,590 B2 * | 8/2008 | Huang et al. | 348/581 |
| 2004/0252232 A1 * | 12/2004 | Lodder et al. | 348/448 |
| 2008/0055470 A1 * | 3/2008 | Garg et al. | 348/564 |

* cited by examiner

*Primary Examiner*—Victor Kostak
(74) *Attorney, Agent, or Firm*—Pinnacle Patent Law Group

(57) ABSTRACT

An image scaling system includes a single set of line buffers that receive and store input image pixel data in an input video frame. The scaling system also includes a linear two-dimensional sharpness enhancement unit configured to receive input pixel data from the line buffers and to generate sharpened pixel data by enhancing high frequency components of the input pixel data at an input image resolution, a linear two-dimensional image scaling unit configured to receive the sharpened pixel data and to convert the sharpened pixel data into scaled sharpened pixel data at an output image resolution, and a transient improvement unit configured to receive the input pixel data from the line buffers, sharpened pixel data and scaled sharpened pixel data to improve transient responses at edges in an output image, and to generate output image pixel data at the output image resolution.

16 Claims, 13 Drawing Sheets

METHOD AND SYSTEM FOR DIGITAL IMAGE SCALING WITH SHARPNESS ENHANCEMENT AND TRANSIENT IMPROVEMENT

FIELD OF THE INVENTION

The present invention relates in general to video signal processing and in particular to a method and system for enhancing sharpness and improving transients while magnifying or reducing a digital image from a video signal.

BACKGROUND OF THE INVENTION

Present day digital imaging devices, such as televisions, digital cameras, and camcorders, offer advanced features that allow a viewer to adjust the image displayed. For instance, the viewer can adjust the color balance of the outputted image, the image's brightness and/or contrast, and the image's resolution. One feature that is popular is a zoom-in/out feature that allows the viewer to magnify or shrink the displayed image. Also popular are picture-in-picture (PIP) and picture-on-picture (POP) features where the display is divided into multiple windows and each window displays a different image signal (i.e., channel), or image. Here, the sizes of the windows can vary according to the viewer's preferences. Accordingly, the degree to which the image is magnified or reduced, i.e., the scaling factor, also varies.

To convert an input image of one resolution or size to an output image of another resolution or size, each target output pixel value is a weighted sum of the pixel values of the input pixels within a convolution window surrounding the target output pixel. For most video standards, e.g., ITU-R BT.470, ITU-R BT.601, ITU-R BT.709, each pixel value of an input video signal is sampled according to a two-dimensional rectangular sampling grid. Similarly, for most display technologies currently in use, e.g., cathode ray tube (CRT), liquid crystal display (LCD), plasma display panel (PDP), digital micro-mirror device (DMD), and liquid crystal on silicon (LCoS), each pixel value of an input video signal is also displayed according to a two-dimensional rectangular grid on the screen of the display device. For these sampling and display systems operating in two-dimensional rectangular grids, separable two-dimensional interpolation filters are often used to reduce the implementation complexity of filtering functions in hardware, firmware, software, or a combination thereof.

A number of interpolation techniques can be used to calculate the value of the output pixel during image scaling. For example, a linear interpolation method calculates the output pixel value as a linear combination of the input pixel values. Typical linear interpolation systems can utilize a bilinear filter, a bicubic filter, a windowed sinc filter, or other similar filters, for performing image magnification and reduction. While simple, the linear interpolation systems can produce visual artifacts in the output image, such as blurriness in fine details, ringing along sharp edges, jaggy edges along diagonal sharp edges, fold-over frequencies, i.e., aliasing, in areas containing over Nyquist frequency components, and beat patterns, i.e., moiré, in areas containing near Nyquist frequency components.

Some of these visual artifacts are objectionable to viewers, especially when the output images are magnified and displayed in a high definition (HD)-capable display device. In particular, blurred details and edges of the output image is a common result of image magnification. These artifacts are exacerbated when the input image itself is blurry and dull, i.e., is not sharp. Generally, perceived sharpness of a displayed image depends on the relative contrast along the edge of an image. Particularly, an image is perceived to be sharper to the human eye as the relative contrast increases along the edges of the image.

In a conventional video transmission and display system, a video signal is passed through a high-frequency peaking filter such that a second derivative component is added to the video signal to enhance the relative contrast along the edges of the image. Nevertheless, if the video signal is then passed through a low pass filter during transmission or storage to reduce its bandwidth, the high-frequency components of the original video signal are attenuated or removed. Thus, if the video signal is scaled up to a higher resolution using a linear scaling method, where new frequency components are not generated, the high-frequency components will not be present at the higher resolution because no such frequency components are present in the original video signal. The resulting output image can exhibit undesirably smooth, as opposed to crisp, edges with inadequate perceived sharpness. This effect is particularly pronounced when an image is magnified.

Moreover, in a conventional video transmission and display system, the bandwidths of the two chrominance, i.e., color difference, channels of a color video signal are usually narrower than the bandwidth of its luminance channel, e.g., Y, in order to reduce the transmission or storage bandwidth. Thus, the high-frequency components of the chrominance channels are attenuated or removed even further. The chrominance channels have lower resolutions than the luminance channel, which results in smoother color edges of the displayed image with poor perceived sharpness.

For example, according to the NTSC analog color television standard, a 4.2 MHz luminance bandwidth is typical to provide a horizontal resolution comparable with the vertical resolution when displayed on a screen with 4:3 aspect ratio. In the chrominance channels, however, only a 1.3 MHz bandwidth for the I channel and a 500 kHz bandwidth for the Q channel are considered as acceptable. According to the ITU-R BT.601 digital component video standard, there are several luminance (Y) and chrominance (Cb and Cr) signal sampling formats, such as 4:4:4, 4:2:2, 4:1:1, and 4:2:0. Except for the 4:4:4 YCbCr format where the chrominance (Cb and Cr) signals have the same sampling rates and resolutions as the luminance (Y) signal, the chrominance (Cb and Cr) signals have sampling rates and resolutions one half or one quarter to that of the luminance (Y) signal in the horizontal and/or vertical dimensions. To display pixel data in such YCbCr formats with subsampled chrominance data, the video signal is first converted to 4:4:4 YCbCr format using interpolation to generate the missing Cb and Cr pixel data in the horizontal and/or vertical dimensions. Such interpolation usually results in a blurrier color edge of the displayed image.

In order to improve the perceived sharpness of an image, the high frequency components of each channel can be enhanced in order to increase the relative contrast along the edges of the image, which in turn, increases the perceived sharpness of the details in the image. In addition, because the smooth edges and blurred details in an image are due to slow transitions in the video signal at the edges, the image can be made sharper by shortening the transitions. The transitions in the video signal are referred to as luminance transients and chrominance transients. Various techniques can be used to shorten the luminance and chrominance transients in order to improve the perceived sharpness of an image without increasing the resolution. For example, in linear processing techniques, a high frequency detail signal is extracted from the input signal transitions and, after controlled amplification, is added back to the transitions without group delay error and with proper phasing. In nonlinear processing techniques, nonlinearly shortened transitions are generated from the original image transitions without introducing undershoot and overshoot ringing artifacts. In both cases, transitions in the resultant output video signal are shorter in duration, and thus the output image is perceptually sharper than the input image.

Typically, linear sharpness enhancement and nonlinear transient improvement are performed in series, i.e., the high frequency components of the video signal are enhanced and then the transients improved, or vice versa, after an image has been magnified or reduced. For best results, sharpness enhancement and transient improvement should be performed horizontally and vertically, i.e., in two dimensions. Thus, each operation utilizes its own set of line buffers to store pixel data in more than one scan line so that two dimensional image processing can be performed.

A display system that includes an image scaler module, an image sharpness enhancement module, and a transient improvement module can generate magnified images that have crisp edges and sharp details in both horizontal and vertical dimensions. Nonetheless, such a system is often considered impractical because each component requires its own set of pixel buffers and line buffers. Such pixel buffers and line buffers increase the complexity and cost of the system. Moreover, reading and writing image pixel data from and to the buffers consume system resources such as power consumption and memory bandwidth. This additional cost and complexity is prohibitive for less expensive display systems and therefore, images displayed by such systems are typically blurry and soft at the edges in either or both of the horizontal and vertical dimensions.

Accordingly, it is desirable to provide a method and system that is suitable for enhancing sharpness and improving transients during image magnification or reduction. The method and system should be cost effective and computationally efficient. In addition, the method and system should produce an output image substantially without blurriness, ringing, jaggy edges, aliasing, moiré, and other visual artifacts over a wide range of image magnification and reduction factors.

SUMMARY OF THE INVENTION

In one embodiment, an image scaling system for converting an input image comprising input pixel data from an input video signal conveying a plurality of input video frames at an input resolution into an output image at an output resolution includes a single set of line buffers that receive and store input image pixel data from scan lines in an input video frame. The scaling system also includes a linear two-dimensional (2D) sharpness enhancement unit configured to receive input pixel data from the single set of line buffers and to generate in at least one of a horizontal and vertical direction sharpened pixel data by enhancing high frequency components of the input pixel data at the input image resolution. The scaling system also includes a linear two-dimensional image scaling unit configured to receive the sharpened pixel data from the linear two-dimensional sharpness enhancement unit and to convert in at least one of a horizontal and vertical direction the sharpened pixel data into scaled sharpened pixel data at the output image resolution. The scaling system also includes a transient improvement unit configured to receive the input pixel data from the single set of line buffers, sharpened pixel data from the linear two-dimensional sharpness enhancement unit and scaled sharpened pixel data from the linear two-dimensional image scaling unit, to improve transient responses at edges in the output image, and to generate output image pixel data at the output image resolution. The linear two-dimensional sharpness enhancement unit, the linear two-dimensional image scaling unit and the transient improvement unit share the single set of line buffers, thereby reducing costs, complexity and power consumption of the system.

In another embodiment, a method for converting an input image comprising input pixel data from an input video signal conveying a plurality of input video frames at an input resolution into an output image at an output resolution includes providing a single set of line buffers, receiving and storing input pixel data from a scan line in an input video frame in each line buffer of the set of line buffers, receiving input pixel data from the single set of line buffers and sharpening in at least one of a horizontal and vertical direction the input pixel data at the input resolution, and receiving the sharpened pixel data and converting in at least one of a horizontal and vertical direction the sharpened pixel data into scaled sharpened pixel data at the output resolution. The method also includes receiving input pixel data from the single set of line buffers, sharpened pixel data at the input resolution, and scaled sharpened pixel data at the output resolution, improving transient responses at edges in the output image, and generating output image pixel data at the output image resolution, substantially in parallel with the sharpening and scaling processes. An image at the output resolution with enhanced sharpness and improved transients is outputted.

In another embodiment, a method for generating a scaled output image with enhanced sharpness and improved transients includes providing a single set of line buffers, receiving and storing input pixel data from a scan line in an input video frame in each line buffer of the set of line buffers, receiving the input pixel data from the single set of line buffers and sharpening in at least one of a horizontal and vertical direction the input pixel data, and scaling in at least one of a horizontal and vertical direction the sharpened pixel data from an input resolution to an output resolution. In addition, the method includes receiving the input pixel data from the single set of line buffers and improving transients in the output image substantially in parallel with the sharpening and scaling processes. By performing the pixel sharpening, scaling and transients improving processes substantially in parallel, the costs, complexity and power consumption of the method are reduced.

In another embodiment, a system for generating a scaled output image with enhanced sharpness and improved transients includes a single set of line buffers for receiving and storing input pixel data from scan lines in an input video frame, means for sharpening in at least one of a horizontal and vertical direction the input pixel data received from the single set of line buffers, means for scaling in at least one of a horizontal and vertical direction the sharpened pixel data from an input resolution to an output resolution, and means for improving transients in the output image. In this embodiment, the means for improving transients is configured to share the single set of line buffers with the sharpening and scaling means and to operate substantially in parallel with the sharpening and scaling means, thereby reducing the costs, complexity and power consumption of the system.

DESCRIPTION OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION OF THE INVENTION

The present invention relates in general to video signal processing and in particular to a method and system for enhancing sharpness and improving transients while magnifying or reducing a digital image from a video signal. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to one embodiment of the present invention, an image scaling system includes a linear two-dimensional (2D) sharpness enhancement unit, a linear 2D image scaling unit, and a transient improvement unit. Each unit shares a single set of line buffers that store input pixel data from a set of scan lines in an input video frame. In particular, the sharpness enhancement unit and the transient improvement unit receive input pixel data from the single set of line buffers, and process the input pixel data substantially in parallel, as opposed to, in series. The image scaling unit receives sharpened pixel data from the sharpness enhancement unit, magnifies or reduces the image based on sharpened pixel data, and transmits scaled sharpened pixel data to the transient improvement unit. The transient improvement unit processes the input pixel data received from the single set of line buffers, sharpened pixel data from the sharpness enhancement unit and scaled sharpened pixel data from the image scaling unit to improve the transient responses at edges in the output image. By sharing the single set of line buffers and processing the input pixel data substantially in parallel, the image scaling system according to an embodiment of the present invention is capable of enhancing the sharpness and of improving the transients of the scaled output image with lower hardware and software complexity, cost, and power consumption than other systems performing similar functions.

Figure 1:
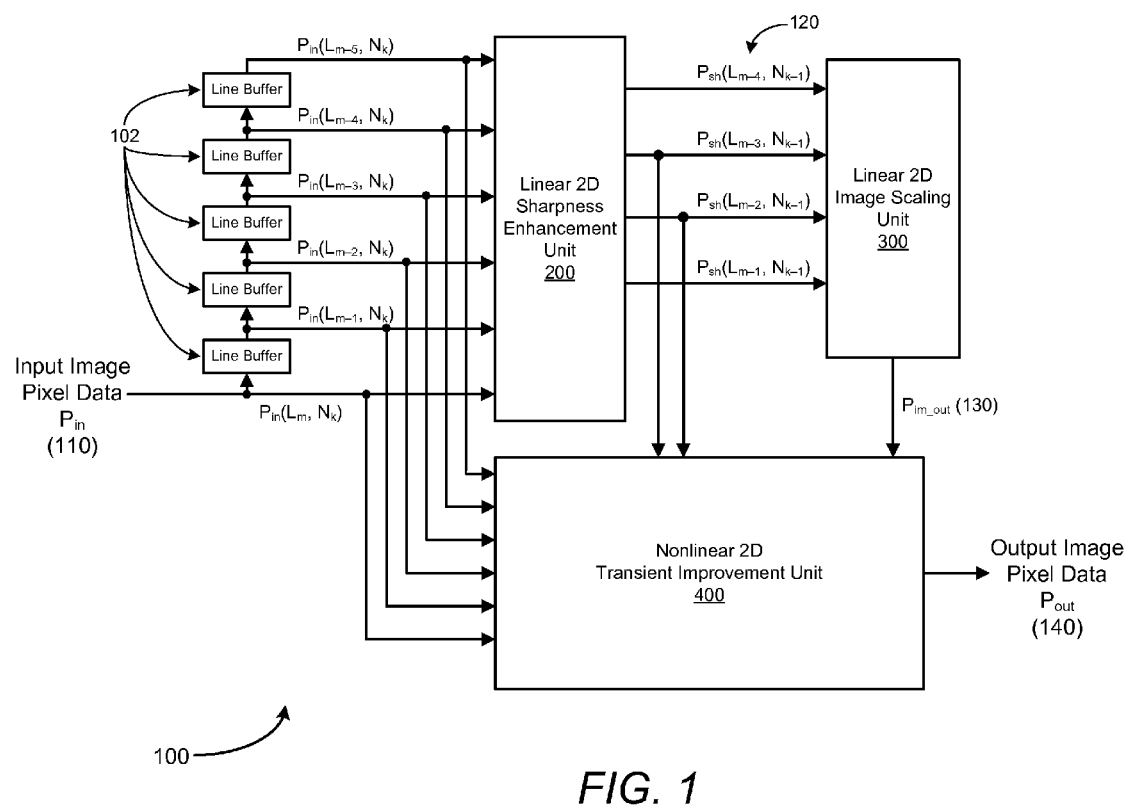
FIG. 1 is a block diagram of an exemplary image scaling system according to one embodiment of the present invention.

FIG. 1 illustrates a block diagram of an exemplary image scaling system 100 according to one embodiment. The image scaling system 100 includes a set of line buffers 102. Each line buffer 102 stores input pixel data 110 in a scan line in an input video frame. The image scaling system 100 also includes a means for enhancing the sharpness of pixel data 110. In one embodiment, the image scaling system 100 can include a linear 2D sharpness enhancement unit 200 that is configured to receive the input pixel data 110 from the set of line buffers 102, to enhance the sharpness of the input pixel data 110, and to generate sharpened pixel data 120.

In addition, the image scaling system 100 includes a means for scaling pixel data. In one embodiment, the image scaling system 100 can include a linear 2D image scaling unit 300 that is configured to receive sharpened pixel data 120 from the linear 2D sharpness enhancement unit 200, to scale, i.e., magnify or reduce, the image based on the sharpened pixel data 120, and to generate scaled sharpened pixel data 130. Moreover, the image scaling system 100 includes a means for improving the transient responses at the edges of an image. For example, the image scaling system 100 can include a transient improvement unit 400 that is configured to receive the input pixel data 110 from the set of line buffers 102, sharpened pixel data 120 from the linear 2D sharpness enhancement unit 200, and the scaled sharpened pixel data 130 from the linear 2D image scaling unit 300, and to generate output pixel data 140 of a scaled image with enhanced sharpness and improved transients.

Figure 2:
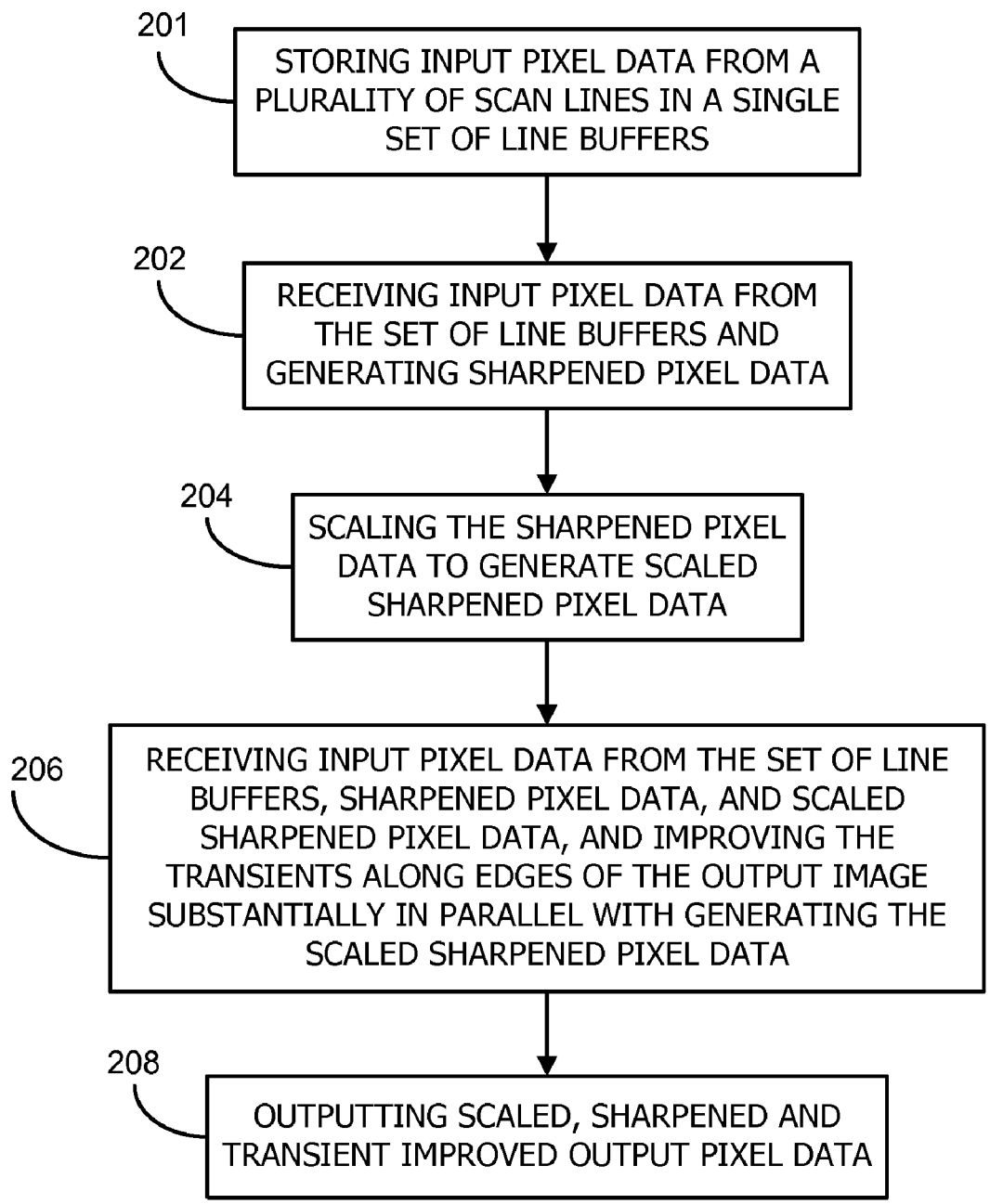
FIG. 2 is a flow chart illustrating an exemplary process for scaling an image according to an embodiment of the present invention.

FIG. 2 is a flowchart illustrating an exemplary process of scaling an image using the image scaling system 100 according to one embodiment. Referring to FIG. 1 and FIG. 2, the process begins by storing input pixel data 110 from a plurality of scan lines in an input video frame in a single set of line buffers 102 (block 201). The linear 2D sharpness enhancement unit 200 receives the input pixel data 110 from the line buffers 102 and generates sharpened pixel data 120 in one or both of the horizontal and vertical dimensions (block 202).

Figure 3A:
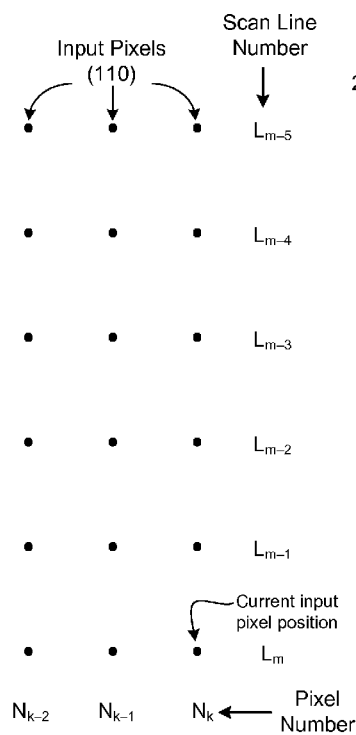
FIGS. 3A-3C illustrate input pixels in a plurality of scan lines in a video frame according to an embodiment of the present invention.
Figure 3B:
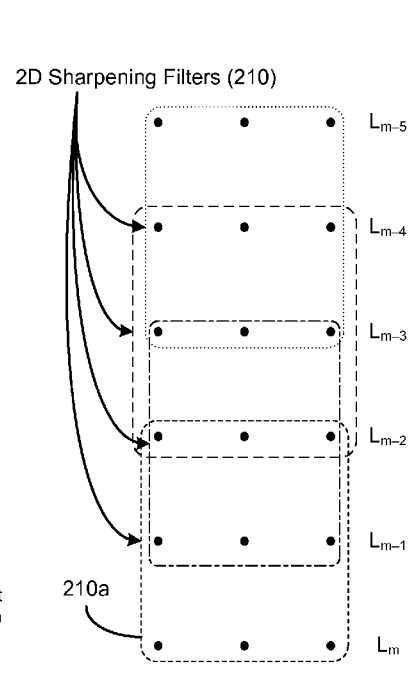
Figure 3C:
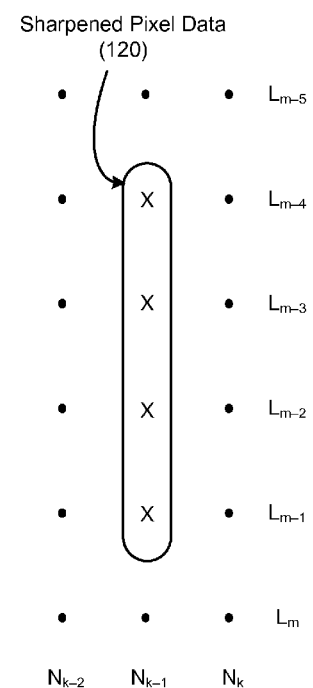

In one embodiment, the linear 2D sharpness enhancement unit 200 receives the input pixel data 110 of pixels at a current pixel position, $N_k$, in a plurality of contiguous scan lines, e.g., $L_m$ to $L_{m-5}$, as shown in FIG. 3A. By storing the input pixel data 110 in pixel buffers, two dimensional rectangular sharpening filters can be formed, as shown in FIG. 3B. In one embodiment, a sharpening filter 210 forms a 3×3 pixel array that is nearly isotropic. The pixels in the nearly isotropic sharpening filter 210 can be used to enhance, i.e., peak, most high spatial frequency components along all directions present in the input pixel data 110. In one embodiment, the pixels in each sharpening filter 210 are used to generate sharpened pixel data 120 for a pixel positioned at the center of the sharpening filter 210, as shown in FIG. 3C.

Figure 4:
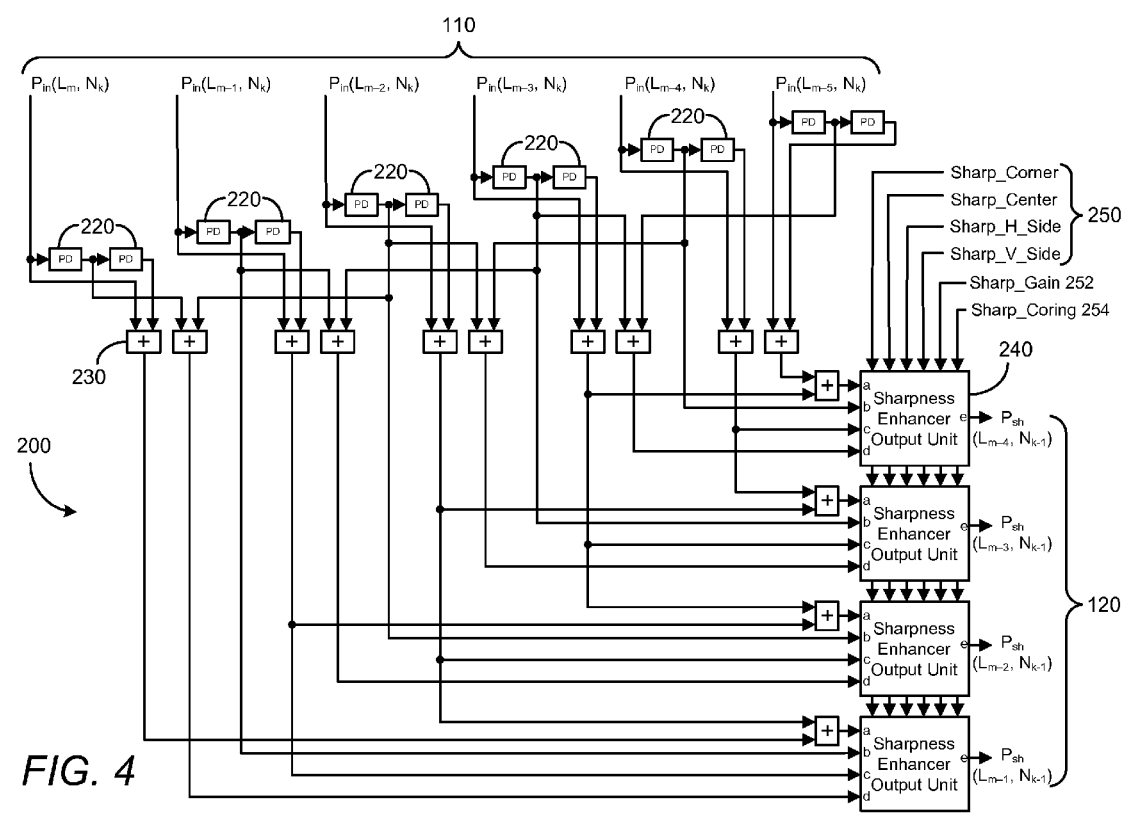
FIG. 4 is a logic diagram of an exemplary linear 2D sharpness enhancement unit according to one embodiment.

FIG. 4 is a logic diagram of an exemplary linear 2D sharpness enhancement unit 200 according to one embodiment. As is shown, the sharpness unit 200 includes a plurality of pixel buffers 220, and a plurality of sharpness enhancer output units 240, each corresponding to a generated sharpened pixel data value 120 using an associated sharpening filter 210. In one embodiment, the sharpness unit 200 receives the input pixel data 110 from the line buffers 102, and each pixel is stored in at least one pixel buffer 220 so that the pixel data 110 corresponding to each sharpening filter 210 can be passed to its corresponding sharpness enhancer output unit 240.

In one embodiment, for a given sharpening filter, e.g., 210a, the lower corner pixels, e.g., $P(L_m, N_k)$ and $P(L_m, N_{k-2})$, are added together by an adder circuit 230 and the upper corner pixels, e.g., $P(L_{m-2}, N_k)$ and $P(L_{m-2}, N_{k-2})$, are summed by an adder circuit 230. Each sum is then in turn added together and transmitted to the sharpness enhancer output unit 240 corresponding to the given sharpening filter 210, e.g., as input (a). The horizontal side pixels, e.g., $P(L_{m-1}, N_k)$ and $P(L_{m-1}, N_{k-2})$ are summed by an adder circuit 230 and transmitted to the sharpness enhancer output unit 240 corresponding to the given sharpening filter 210, e.g., as input (c). In a similar manner, the vertical side pixels, e.g., $P(L_m, N_{k-1})$ and $P(L_{m-2}, N_{k-1})$, are summed by an adder circuit 230 and transmitted to the sharpness enhancer output unit 240 corresponding to the given sharpening filter 210, e.g., as input (d). The center pixel, e.g., $P(L_{m-1}, N_{k-1})$, is transmitted to the sharpness enhancer output unit 240, e.g., as input (b).

In an exemplary embodiment, each sharpness enhancer output unit 240 also receives a plurality of sharpening coefficients 250 that determine the degree and spatial shape of sharpness enhancement desired. In one embodiment, each sharpness enhancer output unit 240 uses the sharpening coefficients 250 to process inputs (a) through (d), and generates the sharpened pixel data 120 corresponding to the pixel located at the center position of the sharpening filter 210a, e.g., $P_{sh}(L_{m-1}, N_{k-1})$.

Figure 5:
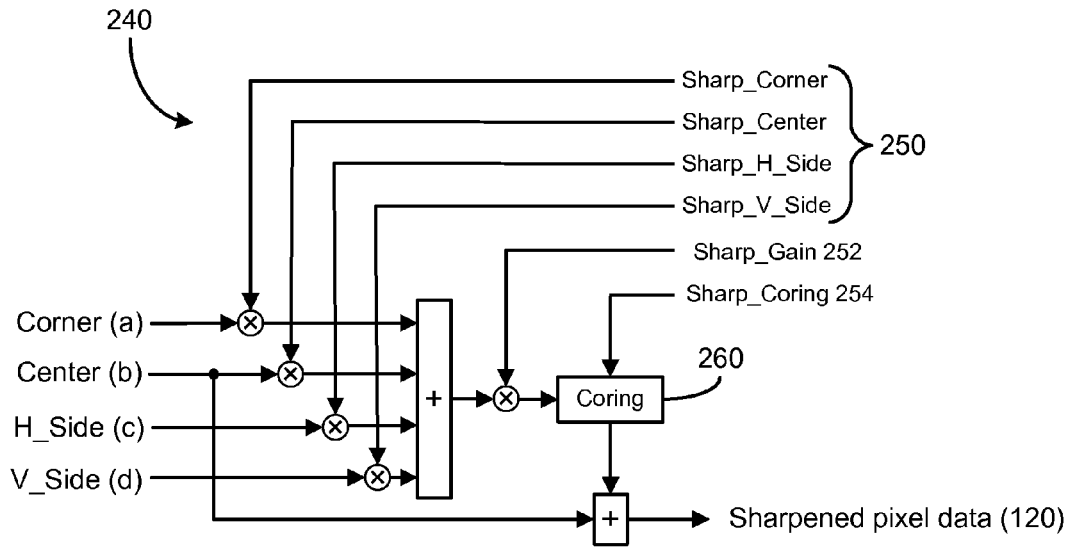
FIG. 5 is a logic diagram of an exemplary sharpness enhancer output unit according to one embodiment.

FIG. 5 is a logic diagram of an exemplary sharpness enhancer output unit 240 according to one embodiment. In the embodiment illustrated in FIG. 5, each input is multiplied with a corresponding sharpening coefficient 250. The product of each input and coefficient is then summed. The sum is then multiplied by a sharpness gain parameter 252 and the product is then subjected to a coring function 260 that is controlled by a sharpness coring parameter 254. Like the sharpening coefficients 250, the sharpness gain parameter 252 also determines the degree of sharpness enhancement desired. The degree of sharpness enhancement can be set by a user/viewer in one embodiment. Alternatively or in addition to, the degree of sharpness enhancement can be based on the level of sharpness present in the input pixel data 110 in another embodiment.

In one embodiment, the coring function 260 is configured to reduce noise by eliminating high frequency signals with amplitudes less than a threshold controlled by the sharpness coring parameter 254. Thus, high frequency noise with small amplitude is not enhanced according to this embodiment. The output of the coring function 260 is added to the pixel data corresponding to the pixel at the center of the sharpening filter 210a to generate the sharpened pixel data 120.

Although four (4) sharpening filters 210 are depicted in FIG. 3 and utilized in the description above, those skilled in the art would readily appreciate that other numbers of sharpening filters 210 can be used. In addition, although a sharpening filter 210 comprising a 3×3 array of pixels is shown and described, the sharpening filter 210 can comprise a different array of pixels that form a near isotropic filter configuration. Accordingly, the method and system of the present invention is not limited to the exemplary configurations described above.

In one embodiment, the input pixel data 110, $P_{in}$, includes a luminance (Y) channel and chrominance (Cb and Cr) channels, and the linear 2D sharpness enhancement unit 200 comprises separate sharpness enhancement units to process each channel. For example, a first linear 2D sharpness enhancement unit 200 can sharpen the Y channel of the input pixel data 110 and generate the Y channel of the sharpened pixel data, e.g., $Y_{sh}$, while second and third linear 2D sharpness enhancement units 200 can sharpen the Cb and Cr channels, respectively, and generate the Cb and Cr channels of the sharpened pixel data, e.g., $Cb_{sh}$ and $Cr_{sh}$.

Referring again to FIG. 2, after the linear 2D sharpness enhancement unit 200 generates the sharpened pixel data 120 (block 202), the linear 2D image scaling unit 300 magnifies or reduces the image based on the sharpened pixel data 120 by generating scaled sharpened pixel data 130 (block 204). In general, to convert an input image of one resolution to an output image of another resolution, each target output pixel value is a weighted average of the input pixels within a convolution window surrounding the target output pixel.

For most world wide video standards, e.g., ITU-R BT.470, ITU-R BT.601, ITU-R BT.709, each pixel value of a video signal is sampled at a two-dimensional rectangular sampling grid. For most display technologies currently in use, e.g., CRT, LCD, PDP, DMD, and LCoS, each pixel value of an input video signal is also displayed at a two-dimensional rectangular grid on the screen of the display device. For these sampling and display systems operating in two-dimensional rectangular grids, separable two-dimensional filter kernels can be used for image scaling, which greatly reduces the amount of computation necessary to perform the scaling function while preserving image quality.

An image scaler utilizing separable two-dimensional (2D) filter kernels typically includes two one-dimensional (1D) image scalers in tandem. A first of the two operates in a vertical or horizontal direction and the second operates in the direction perpendicular to that of the first scaler. Because the image scaling functions in the vertical and horizontal directions are commutative with each other, the order of the two one-dimensional image scalers is irrelevant to the output image. In other words, an input image can be first magnified or reduced horizontally and then magnified or reduced vertically, or vice versa.

A one-dimensional image scaler that has a fractional sampling rate conversion ratio L/M, can be construed as increasing the sampling rate by an integer factor L, i.e., interpolation by L times, followed by decreasing the sampling rate by an integer factor M, i.e., decimation by M times. Finite-duration impulse response (FIR) filter structures with time-varying filter coefficients can be used to magnify or reduce the input image. The filter coefficients of the FIR filters vary according to the relative proximity, i.e., the phase, between the input and output pixels. These FIR filter structures are called polyphase filters for interpolation or decimation and are well known to those skilled in the art. For direct-form FIR architecture, the FIR structures operate at the output sampling rate and compute each output pixel as a weighted average of the associated input pixels within a convolution window. A plurality of filter coefficients used in calculating the weighted average are selected from a filter coefficient lookup table LUT according to the relative position, i.e., the phase, among the input image pixels and the output image pixels.

Typically, 2D image scalers require line buffers, as well as pixel buffers to store pixels in a scan line and pixels in vertically adjacent scan lines. According to one embodiment of the present invention, however, the linear 2D image scaling unit 300 can share the set of line buffers 102 and therefore, requires only pixel buffers. In one embodiment, the linear 2D image scaling unit 300 can include separate scaling units to process separately the Y channel, the Cb channel and the Cr channel.

Figure 6:
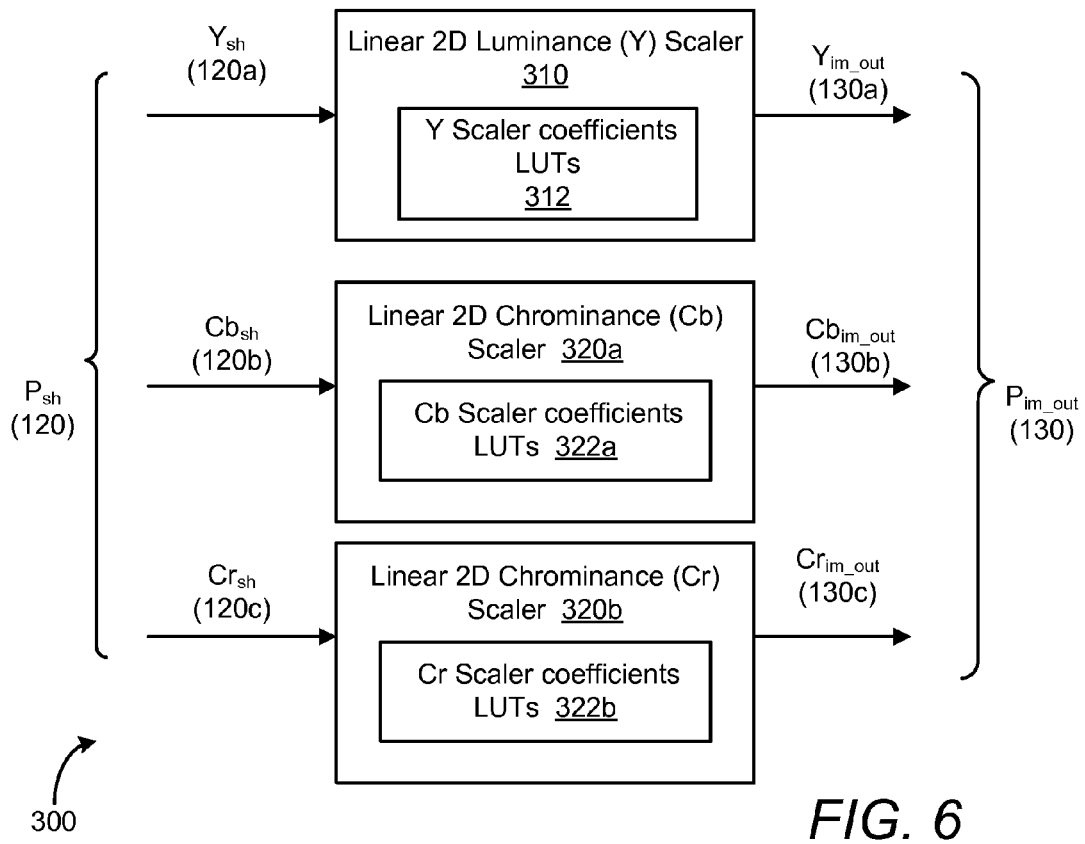
FIG. 6 is a block diagram of an exemplary linear 2D image scaling unit according to one embodiment.

FIG. 6 is a block diagram of an exemplary linear 2D image scaling unit 300 according to one embodiment. The image scaling unit 300 includes a first 2D luminance (Y) scaler 310 to scale the Y channel of the sharpened pixel data $Y_{sh}$ 120a and to generate the Y channel of the scaled sharpened pixel data $Y_{im\_out}$ 130a. The image scaling unit 300 also includes second and third 2D chrominance (Cb Cr) scalers 320a, 320b to scale the Cb and Cr channels of the sharpened pixel data $Cb_{sh}$ 120b and $Cr_{sh}$ 120c, respectively, and to generate the Cb and Cr channels of the scaled sharpened pixel data $Cb_{im\_out}$ 130b and $Cr_{im\_out}$ 130c. Each of the scalers 310, 320a, 320b includes a plurality of coefficient LUTs 312, 322a, 322b that store a plurality of sets of filter coefficients for calculating the interpolated and decimated pixel values for image magnification and image reduction, respectively. As is shown, the Y scaler 310 receives the luminance channel of the sharpened pixel data, $Y_{sh}$, 120a, and the Cb 320a and Cr 320b scalers each receive the chrominance channels of the sharpened pixel data, $Cb_{sh}$, $Cr_{sh}$, 120b, 120c, respectively. Each scaler 310, 320a, 320b also receives phase data from a sequencer unit (not shown) that determines which of the plurality of sets of filter coefficients should be selected to calculate the scaled sharpened pixel data 130, $Y_{im\_out}$ 130a, $Cb_{im\_out}$, 130b and $Cr_{im\_out}$ 130c.

In addition to using luminance (Y) channel and chrominance (CbCr) channels to record and transmit pixel data of a color video signal, other multi-channel formats are also possible. For example, three primary color channels such as red, green, and blue or cyan, magenta, and yellow can also be used to record and transmit pixel data of a color video signal. According to one embodiment, the selected set of filter coefficients from the filter coefficient lookup table 312, 322a, 322b depends on the relative position among the input image pixels and the output image pixels. Thus, one set of selected filter coefficients can be used for each color channel of a same pixel.

According to another embodiment, different filter phases can be used for different color channels to achieve slightly better visual performance. For example, for a recording and transmission system that uses luminance and chrominance channels to represent pixel data of a color video signal, different sets of selected filter coefficients can be used for the luminance and chrominance channels in order to compensate for the slight different group delay values suffered by the luminance and chrominance channels. As another example, for display devices such as LCD or PDP that have fixed pixels consisting of spatially distributed sub-pixels for different primary color channels, different sets of selected filter coefficients can be used for different primary color channels corresponding to different sub-pixels of a same pixel. This technique is called sub-pixel rendering and is well known to those skilled in the art.

Figure 7A:
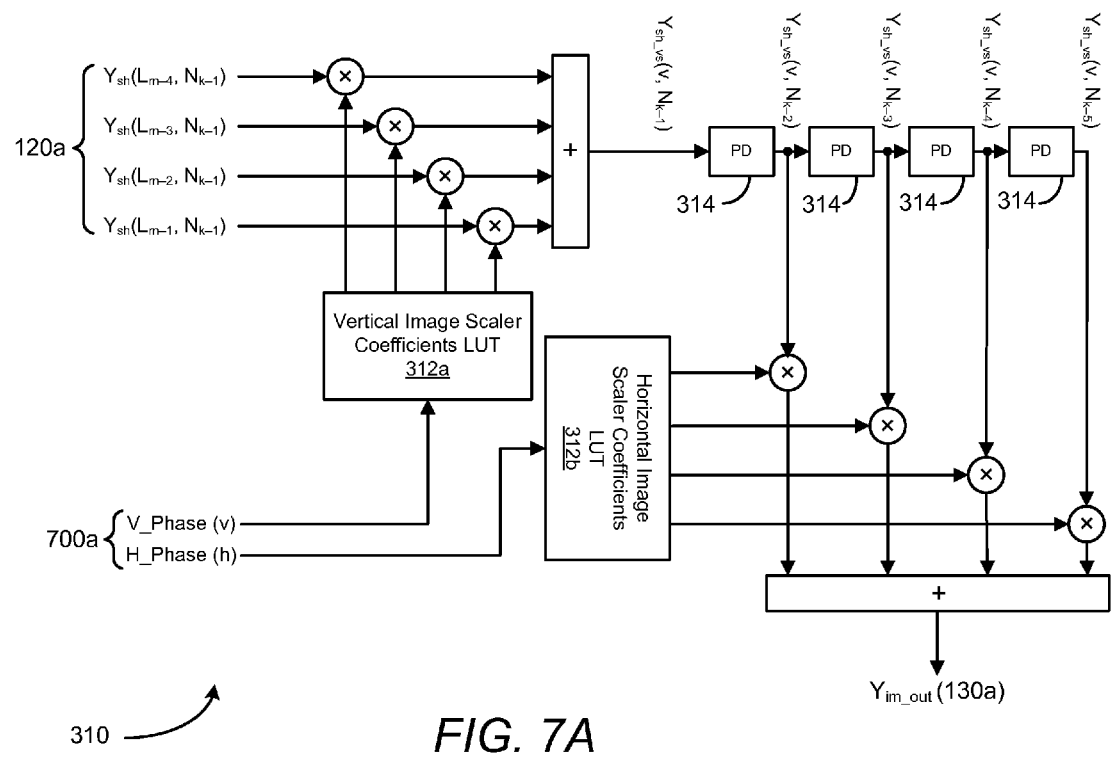
FIGS. 7A and 7B are logic diagrams of the 2D luminance (Y) scaler and 2D chrominance (CbCr) scaler, respectively, according to one embodiment.
Figure 7B:
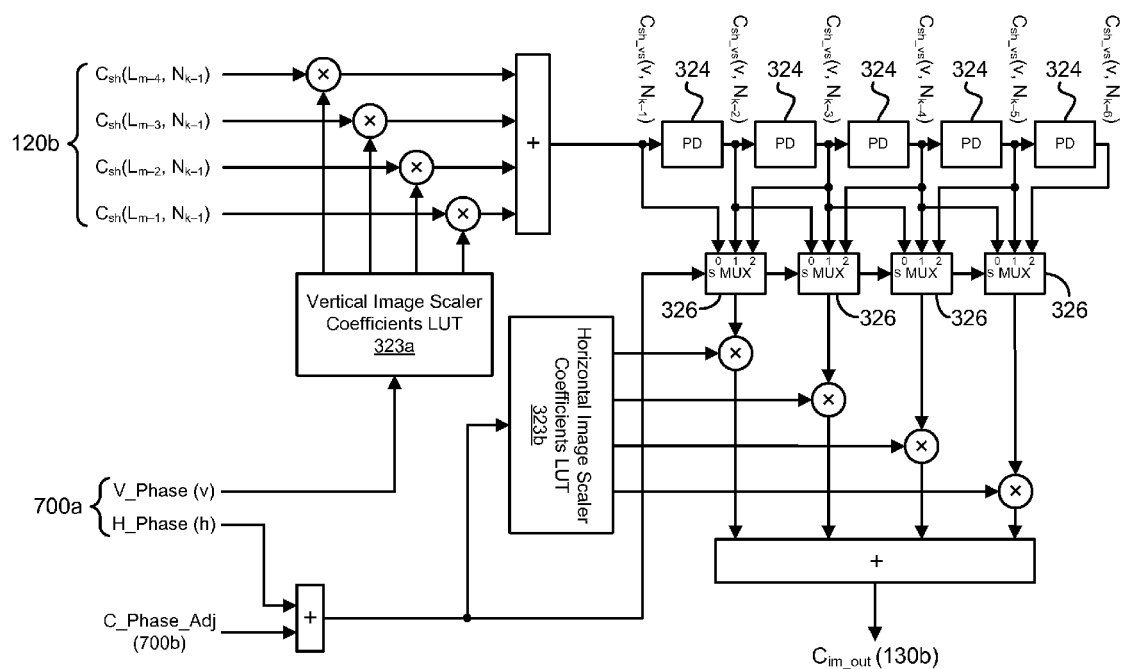

FIGS. 7A and 7B are logic diagrams of the linear 2D Y scaler 310 for the luminance channel and a linear 2D scaler, e.g., 320a, for a chrominance channel, e.g., Cb, respectively, according to one embodiment. Because the linear 2D scalers for the chrominance channels, e.g., Cb and Cr, are functionally equivalent, only one of the scalers, e.g., 320a, need be described. As is shown, each scaler 310, 320a includes a vertical image scaler coefficients LUT 312a, 323a and a horizontal image scaler coefficients LUT 312b, 323b. Each scaler 310, 320a receives phase data 700a that comprises a vertical phase indicator and a horizontal phase indicator. The vertical phase indicator determines which set of the vertical scaler coefficients should be selected and the horizontal phase indicator determines which set of the horizontal scaler coefficients should be selected.

In one embodiment, the Cb scaler 320a also receives a phase adjustment factor 700b to eliminate chrominance-luminance mis-alignment due to group delay dispersion between the chrominance and luminance channels. The phase adjustment factor 700b is added to the horizontal phase indicator, and the adjusted horizontal phase indicator is then used to determine which set of the horizontal scaler coefficients should be selected and is also used to determine the convolution window.

Each scaler 310, 320a receives its corresponding channel of the sharpened pixel data 120a, 120b. Because the linear 2D sharpness enhancement unit 200 outputs sharpened pixel data 120 corresponding to vertically adjacent pixels, e.g., $P(L_{m-1}, N_{k-1})$ to $P(L_{m-4}, N_{k-1})$, line buffers are not necessary for each scaler 310, 320a. As is shown, each sharpened pixel 120a, 120b is multiplied by its corresponding vertical scaler coefficient and summed. The vertically scaled sharpened pixel is then stored in a plurality of pixel buffers 314, 324 and subsequently scaled horizontally using the selected horizontal scaler coefficients. Although not described, the Cr scaler 320b processes the corresponding sharpened pixel data 120c in a similar manner.

Accordingly, the Y scaler 310, the Cb scaler 320a, and the Cr scaler 320b generate scaled sharpened pixel data, $Y_{im\_out}$ 130a, $Cb_{im\_out}$ 130b, and $Cr_{im\_out}$ 130c, respectively. In this embodiment, each scaler 310, 320a, 320b scales the pixel data in the vertical direction first and then in the horizontal direction thereafter. Because each scaler 310, 320a, 320b shares the set of line buffers 102 with the linear 2D sharpness enhancement unit 200, the order of vertical scaling and horizontal scaling cannot be reversed in this embodiment.

Referring again to FIG. 2, as the linear 2D sharpness enhancement unit 200 and the linear 2D image scaling unit 300 are processing the input pixel data 110 and sharpened pixel data 120, respectively, the transient improvement unit 400 substantially simultaneously receives the input pixel data 110 from the line buffers 102, sharpened pixel data 120 from the sharpness unit 200 and the scaled sharpened pixel data 130 from the scaling unit 300, and improves the transient responses along edges of the output image (block 206). In particular, the transient improvement unit 400 receives the input pixel data 110 from the set of line buffers 102, determines if an edge is present, generates scaled edge data 430, and then nonlinearly combines the scaled edge data 430, the sharpened pixel data 120, and the scaled sharpened pixel data 130 to produce scaled, sharpened and transient improved output pixel data 140 (block 208).

Figure 8:
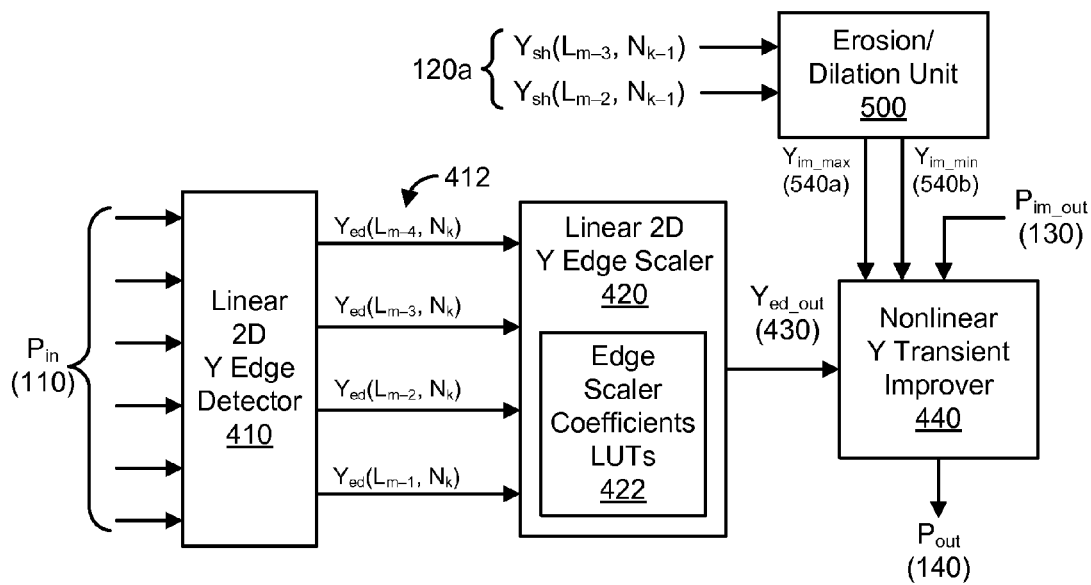
FIG. 8 is a block diagram of an exemplary transient improvement unit according to one embodiment.

FIG. 8 is a block diagram of an exemplary transient improvement unit 400 according to one embodiment. The transient improvement unit 400 includes a linear 2D edge detector 410, a linear 2D edge scaler 420, a 2D image erosion and dilation unit 500, and a nonlinear transient improver 440. In one embodiment, the linear 2D edge detector 410 detects edge information of the luminance channel of the input pixel data 110a and generates edge data 412 at the input image resolution. The linear edge scaler 420 then converts the edge data 412 at the input image resolution into scaled edge data 430 at the output image resolution. The image erosion and dilation unit 500 calculates a local maximum value 540a and a local minimum value 540b among luminance channel values of the sharpened pixel data $Y_{sh}$ 120a within a decision window. The transient improver 440 nonlinearly combines the local maximum 540a and local minimum 540b values of the sharpened pixel data 120a at the input image resolution, each channel of the scaled sharpened pixel data 130 and the scaled edge data 430 at the output image resolution, and generates output image pixel data 140 at the output image resolution which is properly magnified or reduced with enhanced sharpness and improved transients.

According to one embodiment, a Gaussian-like filter response is utilized to scale the edge data 412. A Gaussian filter is particularly advantageous in scaling the edge data 412 and generating the scaled edge data 430 because:

It is non-negative and it will never produce negative output pixel values from non-negative input pixel values;

It falls to zero much faster than a sinc filter and it can be truncated for |x| greater than about three times of the standard deviation a with little loss of quality;

It is both circular symmetric (important for isotropic image quality) and separable (useful in efficiently implementing the filter in hardware, firmware, and/or software);

It achieves optimal frequency-domain and spatial-domain localization, i.e., the lower bound of the principle of uncertainty between the spatial and the frequency domains;

It achieves the minimal product of its second central moments in the spatial and the frequency domains, and has the most localized energy in both the spatial domain (for shorter impulse response) and the frequency domain (for lower stop band leakage);

It is an approximating filter, as opposed to an interpolating filter, i.e., it generates output pixel values which do not necessarily pass through all of the sample points of the input image, thus it produces a blurrier output image than an interpolating filter such as sinc filter; and It is its own Fourier transform and it is invariant under convolution.

Figure 15:
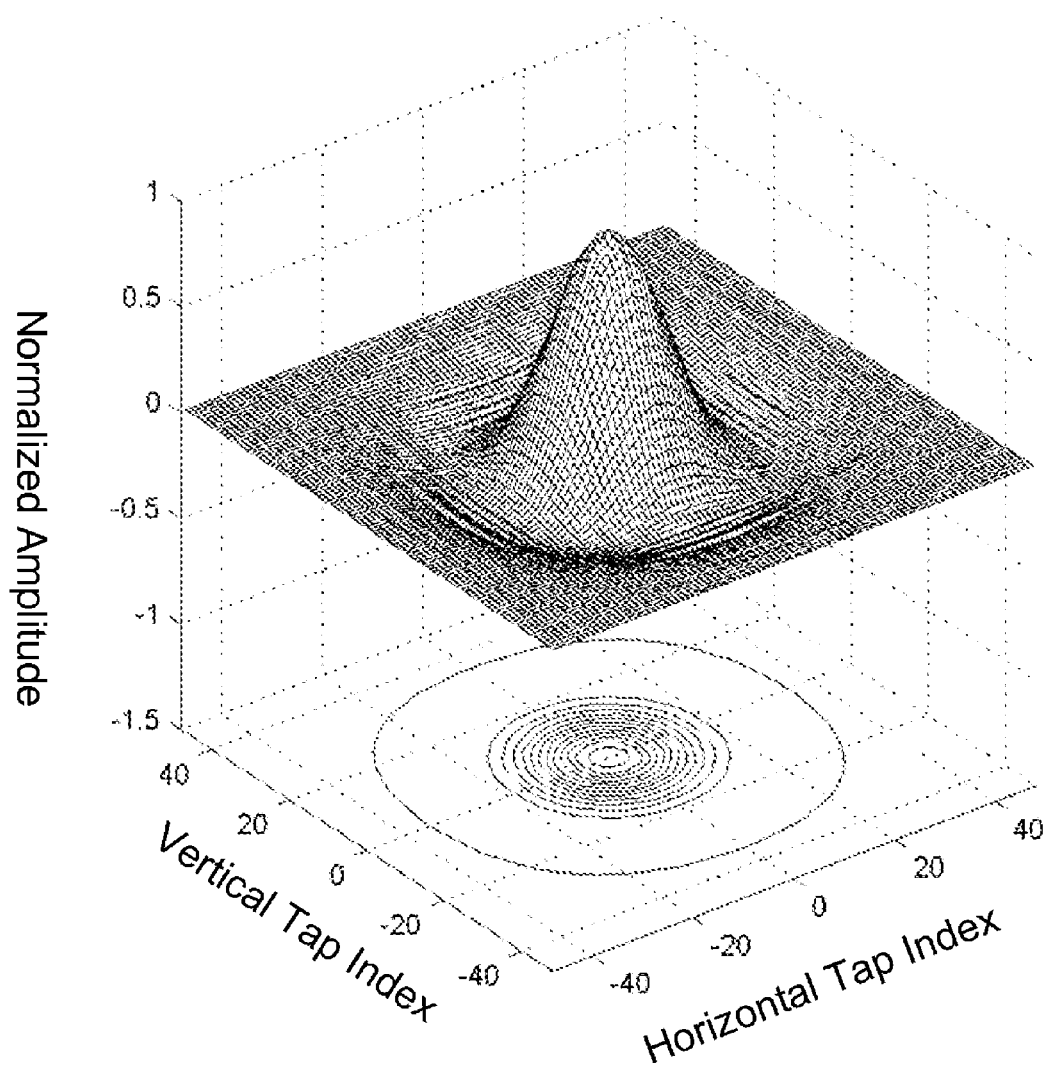
FIG. 15 is a three-dimensional graph illustrating the circularly symmetrical Laplacian of Gaussian edge detection filter response.

For two-dimensional edge detection, the Laplacian operator is a discrete analog of a second derivative operation which has an isotropic response. In order to ameliorate the effects of noise, the Laplacian operator is typically applied to the Gaussian smoothed image due to its isotropic property. Because convolution is associative, taking the Laplacian of a Gaussian smoothed image is equivalent to convolving the Laplacian of Gaussian filter with the image. The Laplacian of Gaussian filter is a discrete analog of an isotropic second derivative of a 2D Gaussian filter and its shape looks quite like a Mexican hat, as shown in FIG. 15. Because convolution is also commutative, convolving the Laplacian of Gaussian filter with an image is equivalent to Gaussian smoothing the Laplacian of the image.

Hence, according to one embodiment, the scaled edge data 430 is obtained by applying a Laplacian-like operator to the input pixel data 110 in the two-dimensional edge detector 410 to generate the edge data 412 and then implementing a Gaussian-like filter response by the linear edge scaler 420 to smooth and scale the edge data 412 to the output image resolution. Because the edge detection filter (i.e., Laplacian of Gaussian filter) is almost circularly symmetric, the nonlinear transient improver 440 can generate isotropic high spatial frequency components not present in the input images in a controlled manner.

Figures 9A, 9B, 9C:
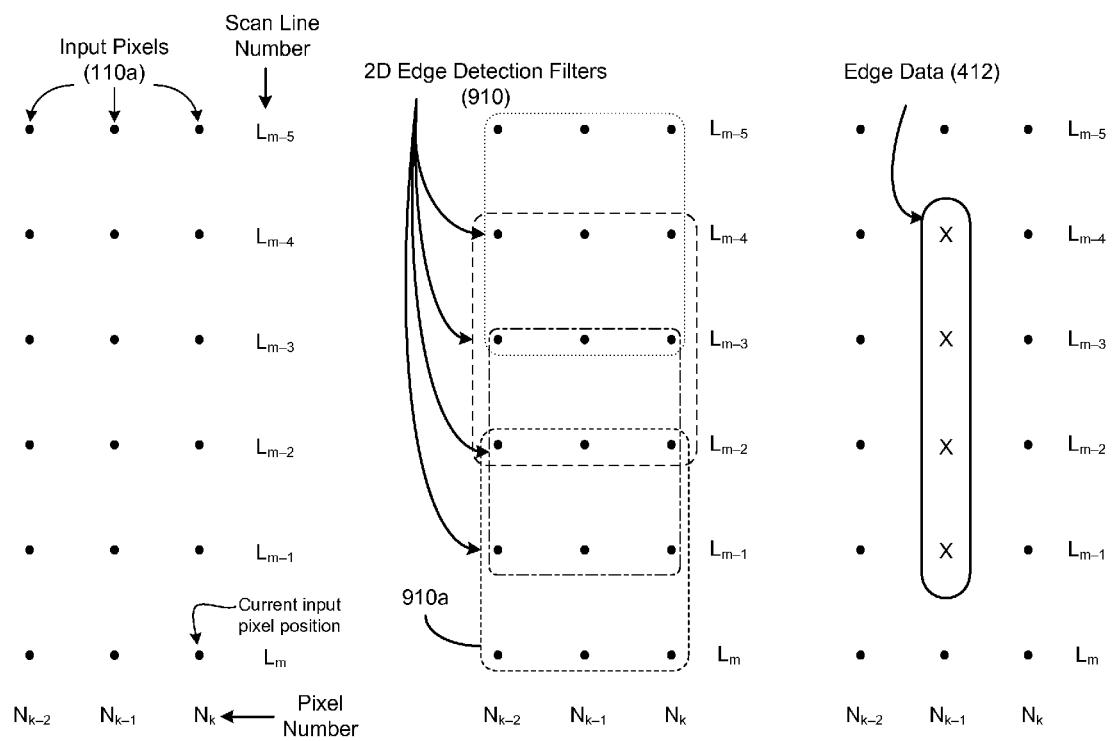
FIGS. 9A-9C illustrate input pixels in a plurality of scan lines in a video frame according to an embodiment of the present invention.

According to one embodiment, the edge detector 410 receives the luminance channel, $Y_{in}$, of the input pixel data 110a of the pixels received by the linear 2D sharpness enhancement unit 200. That is, the edge detector 410 receives the input luminance pixel data 110a of pixels at a current pixel position, $N_k$, in a plurality of contiguous scan lines, e.g., $L_m$ to $L_{m-5}$, as shown in FIG. 3A and FIG. 9A. Similar to the sharpness unit 200, the input pixel data 110a is stored in pixel buffers to form circularly symmetric edge detection filters, as shown in FIG. 9B. In one embodiment, an edge detection filter 910 forms a 3×3 pixel array that is nearly isotropic and comprises the same pixels of the sharpening filter 210. The pixels in the nearly isotropic edge detection filter 910 can be used to detect and enhance edges in any direction. In one embodiment, the pixels in each edge detection filter 910 are used to generate edge data 412 for a pixel positioned at the center of the filter 910, as shown in FIG. 9C.

Figure 10:
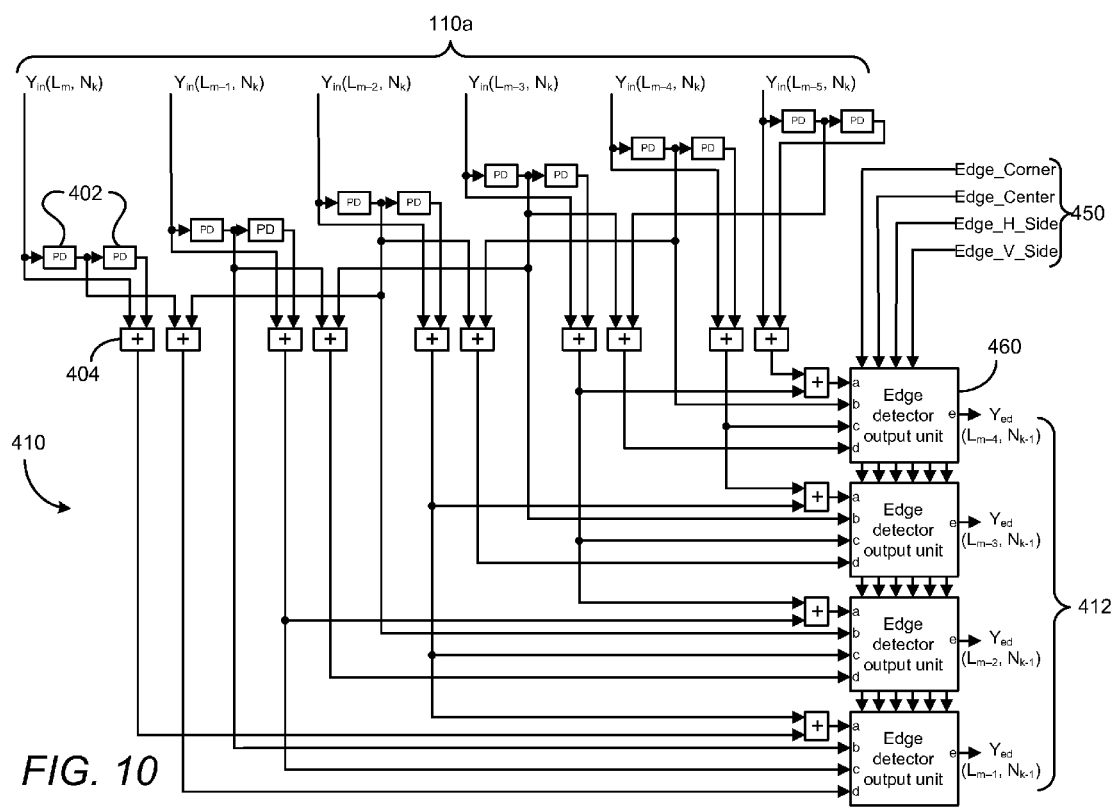
FIG. 10 illustrates a logic diagram of an exemplary linear 2D edge detector according to one embodiment.

FIG. 10 illustrates a logic diagram of an exemplary linear 2D edge detector 410 according to one embodiment. As is shown, the edge detector 410, like the linear 2D sharpness enhancement unit 200, includes a plurality of pixel buffers 402, and a plurality of edge detector output units 460, each corresponding to a generated edge data value 412 using an associated edge detection filter 910. In one embodiment, the edge detector 410, like the sharpness unit 200, receives the input luminance pixel data 110a from the line buffers 102, and each pixel is stored in at least one pixel buffer 402 so that the pixel data 110a corresponding to each edge detection filter 910 can be passed to its corresponding edge detector output unit 460.

In one embodiment, the linear sharpness unit 200 and the linear edge detector 410 can share pixel buffers 220, 402 and adder circuits 230, 404 because the sharpening filters 210 and the edge detection filters 910 comprise the pixel data corresponding to the same pixels. Thus, in addition to sharing line buffers 102, the components of the image scaling system 100 can share pixel buffers 220, 402 and adder circuits 230, 404 to reduce further the cost, complexity and power consumption of the present system.

In an exemplary embodiment, each edge detector output unit 460 receives a plurality of edge detection coefficients 450 that determine the sensitivity and spatial shape of edge detection desired. In one embodiment, each edge detector output unit 460 uses the coefficients 450 to process inputs (a) through (d), and generates the edge data 412 corresponding to the pixel located at the center position of the edge detection filter 910.

Figure 11:
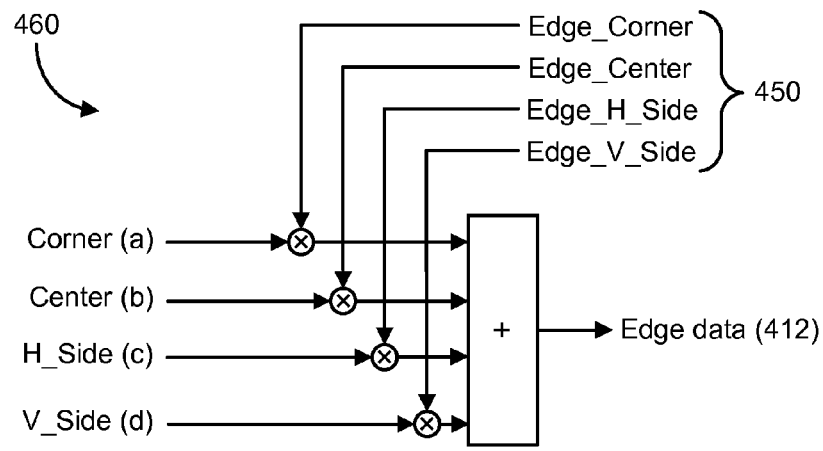
FIG. 11 is a logic diagram of an exemplary edge detector output unit according to one embodiment.

FIG. 11 is a logic diagram of an exemplary edge detector output unit 460 according to one embodiment. Each input is multiplied with a corresponding edge detection coefficient 450. The product of each input and coefficient is then summed. The sum is the isotropic edge data 412.

Figure 12:
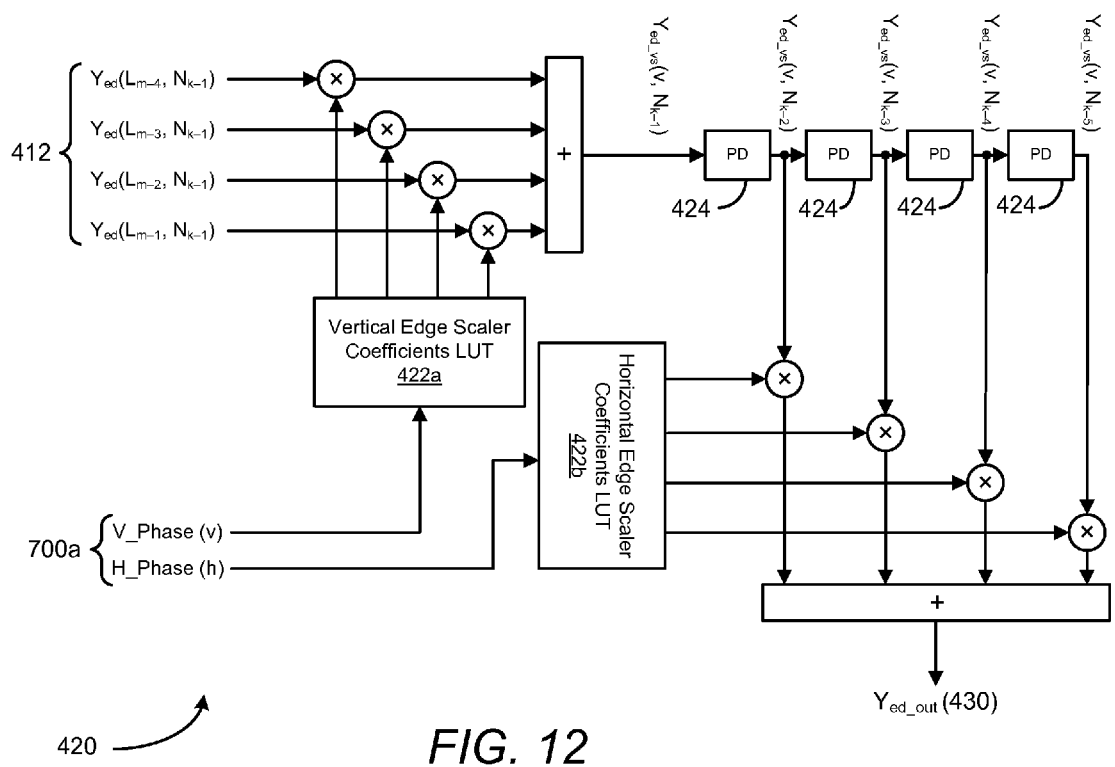
FIG. 12 is a logic diagram of an exemplary linear 2D edge scaler according to one embodiment.

FIG. 12 is a logic diagram of an exemplary linear 2D edge scaler 420 according to one embodiment. As is shown, the edge scaler 420 includes a vertical edge scaler coefficients LUT 422a and a horizontal edge scaler coefficients LUT 422b. The edge scaler 420 receives phase data 700a that comprises the vertical phase indicator and the horizontal phase indicator. The vertical phase indicator determines which set of the vertical scaler coefficients should be selected and the horizontal phase indicator determines which set of the horizontal scaler coefficients should be selected.

The edge scaler 420 receives the edge data 412 for each pixel from the linear 2D edge detector 410 and each edge data value 412 is multiplied by its corresponding vertical scaler coefficient and summed. The vertically scaled edge data is then stored in a plurality of pixel buffers 424 and subsequently scaled horizontally using the selected horizontal scaler coefficients. Because the edge scaler 420 applies a Gaussian-like filter response to smooth and scale the isotropic edge data 412 to the output image resolution, the edge scaler 420 can generate the isotropic scaled edge data, $Y_{ed\_out}$ (430).

Figure 13:
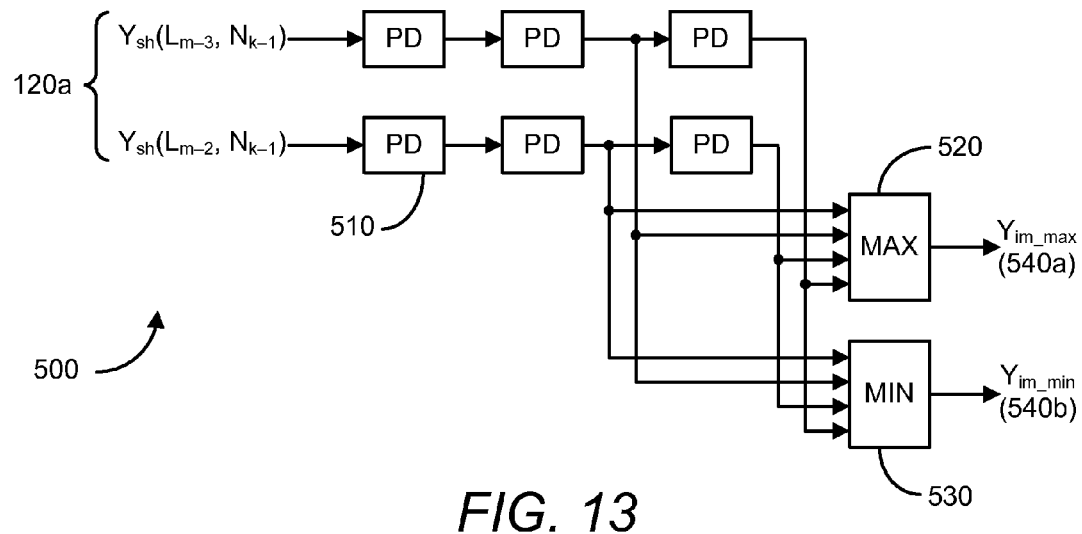
FIG. 13 is a logic diagram of an exemplary image erosion and dilation unit according to one embodiment.

FIG. 13 is a logic diagram of an exemplary 2D image erosion and dilation unit 500 according to one embodiment. As is shown in FIG. 8 and FIG. 13, the erosion and dilation unit 500 receives the luminance channel of the sharpened pixel data 120a corresponding to the two inner sharpened pixels, e.g., $Y_{sh}(L_{m-3}, N_{k-1})$ and $Y_{sh}(L_{m-2}, N_{k-1})$. By buffering the pixel data, a decision window can be defined that comprises sharpened luminance pixel data 120a corresponding to four (4) pixels in a 2×2 pixel array. The four pixel values are processed by a maximizing circuit 520 and a minimizing circuit 530, which output the local maximum $Y_{im\_max}$ 540a and minimum $Y_{im\_min}$ 540b values, respectively.

Figure 14:
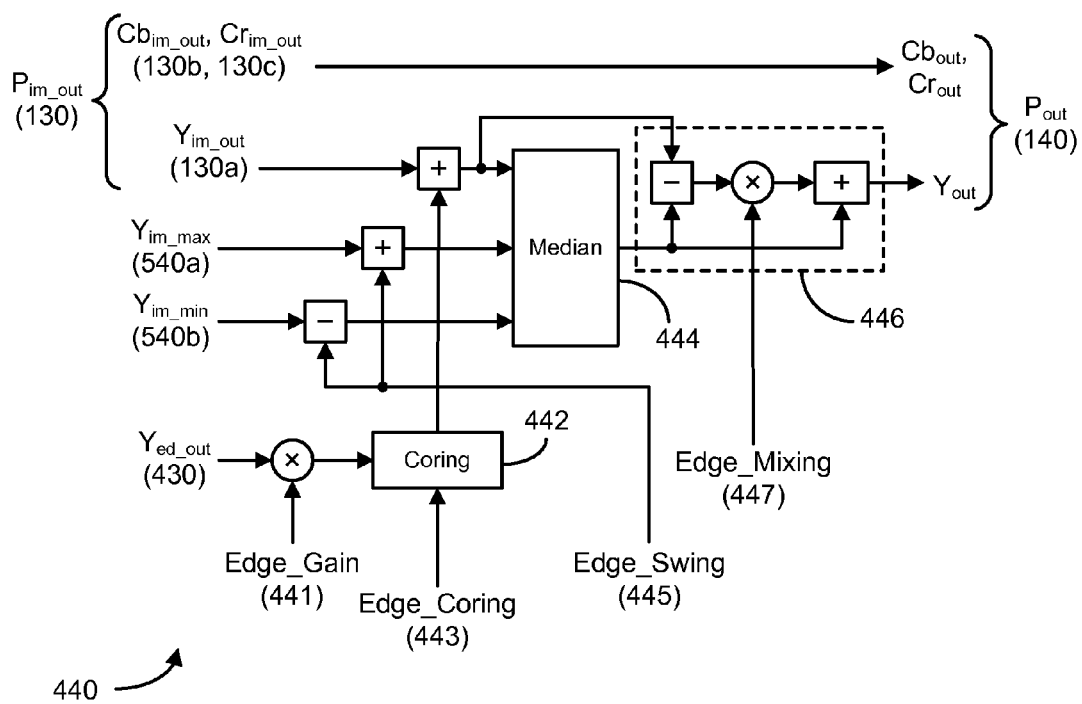
FIG. 14 is a logic diagram of an exemplary nonlinear transient improver according to this embodiment.

FIG. 14 is a logic diagram of an exemplary nonlinear transient improver 440 according to this embodiment. The nonlinear transient improver 440 receives the local maximum 540a and minimum 540b values, the scaled sharpened pixel data 130 and the isotropic scaled edge data 430. In one embodiment, the scaled edge data $Y_{ed\_out}$ 430 is multiplied by an edge gain parameter 441. Like the edge detection coefficients 450, the edge gain parameter 441 also determines the sensitivity of edge detection desired. The sensitivity of edge detection in turn determines the degree of transient improvement desired. The degree of transient improvement can be set by a user/viewer in one embodiment. Alternatively or in addition to, the degree of transient improvement can be based on the level of sharpness present in the input pixel data 110 in another embodiment. The degree of transient improvement can also depend on the image scaling factor due to aliasing artifacts caused by overlapping of spectrum replicas in the spatial frequency domain of the output image generated by the nonlinear processing of transient improvement.

The product of the scaled edge data $Y_{ed\_out}$ 430 and the edge gain parameter 441 is then subjected to a coring function 442 that is controlled by an edge coring parameter 443. The coring function 442 is configured to reduce noise by eliminating high frequency signals with amplitudes less than a threshold controlled by the edge coring parameter 443. Thus, high frequency noise with small amplitude is not detected as edge information according to this embodiment.

The output of the coring function 442 is added to the luminance channel of the scaled sharpened pixel data $Y_{im\_out}$ 130a. In one embodiment, the local maximum 540a and minimum 540b values can be further adjusted by an edge swing parameter 445 to increase the difference between their original values.

In one embodiment, the nonlinear transient improver 440 calculates a median value of the resulting sum of the scaled sharpened pixel data 130a and the output of the coring function 442 and of the adjusted local maximum 540a and minimum 540b values. The median value and the resulting sum of the scaled sharpened pixel data 130a and the output of the coring function 442 are received by a mixer circuit 446 that is controlled by an edge mixing parameter 447. In one embodiment, the edge mixing parameter 447 controls the outputted luminance pixel value $Y_{out}$ between the median value and the resulting sum of the scaled sharpened pixel data 130a and the output of the coring function 442.

In this embodiment, the nonlinear transient improver 440 uses nonlinear operations, such as image dilation and image erosion, and a plurality of parameters 441, 443, 445, 447 for setting and adjusting the visual quality of the output image 140. Image dilation expands the bright region (high gray-level) and contracts the dark region of a signal, while image erosion expands the dark region (low gray-level) and contracts the bright region of the signal. With these properties, an edge region in an input image can be identified when the difference between the dilated and eroded images become larger than a predetermined threshold. In this embodiment, with suitable parameter values, low-level transitions of the image signal can be linearly enhanced without increasing noise and high-level transitions can be nonlinearly improved without generating aliasing, thus a full dynamic range image enhancement can be achieved.

In the embodiment described above, the transient improvement unit 400 can use the luminance channel signals to improve the transients in both the luminance and chrominance channels. Because of the higher bandwidth of luminance signals due to the subsampling of the chrominance signals during the recording and transmission of the color video signals and the high correlation between chrominance and luminance signals, chrominance transient improvement can be controlled or assisted by the corresponding luminance transient in either or both of the horizontal and vertical directions. Hence, the chrominance edges and the corresponding luminance edges can be well aligned to avoid color bleeding or color blurring due to the low definition of the chrominance signals. Alternatively, in another embodiment, chrominance transient improvement can operate independently of luminance transient improvement in either or both of the horizontal and vertical dimensions. In yet another embodiment, chrominance transient improvement may operate in cooperation with the luminance transient improvement and only operate independently of the luminance transient improvement when chrominance transients occur in the absence of a concurrent luminance transient.

According to aspects of the present invention, a video processing method and system is provided for performing digital image scaling with sharpness enhancement and transient improvement in either or both of the horizontal and vertical dimensions. The resulting image exhibits perceived sharpness comparable with the sharpness of an image having a significantly higher resolution in either or both of the horizontal and vertical dimensions. According to one embodiment, the scaling, linear sharpness enhancement, and nonlinear transient improvement processing functions share pixel and line buffers and operate jointly in parallel instead of in series thereby reducing complexity, cost, and power consumption of the system. Therefore, the image scaling and enhancement methods according to aspects of the present invention can be cost effectively implemented in hardware, firmware, software, or a combination thereof.

According to one embodiment, linear sharpness enhancement is applied before image up-scaling in order to reduce computation and storage requirements, while the nonlinear transient improvement is applied after image up-scaling due to spatial bandwidth and aliasing considerations. The suitable amount of sharpness enhancement can depend on the quality of the input video signal and/or the preferences of the viewers, while the suitable amount of transient improvement can also depend on the image scaling factor due to aliasing artifacts caused by overlapping of spectrum replicas in the spatial frequency domain of the output image.

In another aspect, the linear sharpness enhancement unit 200 peaks the high frequency ends of the image spatial bandwidth without expanding it, while the nonlinear transient improver 440 expands the image spatial bandwidth without causing aliasing artifacts or requiring auxiliary signals from the signal source. According to one embodiment, nonlinear transient improvement is applied to improve only higher-level two-dimensional transients by reducing the rise and fall times along edges without generating overshoot and undershoot and without increasing noise in the input video signal. Whereas, linear sharpness enhancement is applied to enhance both lower-level and higher-level two-dimensional transients by reducing the rise and fall times with single-lobe overshoot and undershoot for better perceived sharpness without increasing noise in the input video signal.

The present invention has been described with reference to certain preferred versions. Nevertheless, other versions are possible. For example, the number and types of lookup tables can vary. Further, alternative steps equivalent to those described for the interpolation and decimation process can also be used in accordance with the parameters of the described implementations, as would be apparent to one of ordinary skill. Therefore, the spirit and scope of the appended claims should not be limited to the description of the preferred versions contained herein.

What is claimed is:

1. An image scaling system for converting an input image comprising input pixel data from an input video signal conveying a plurality of input video frames at an input resolution into an output image at an output resolution, the system comprising:
   a single set of line buffers, each line buffer for receiving and storing input pixel data from a scan line in an input video frame;
   a linear two-dimensional sharpness enhancement unit configured to receive input pixel data from the single set of line buffers and to generate in at least one of a horizontal and vertical direction sharpened pixel data at the input resolution by enhancing high frequency components of the input pixel data;
   a linear two-dimensional image scaling unit configured to receive the sharpened pixel data from the linear two-dimensional sharpness enhancement unit and to convert in at least one of a horizontal and vertical direction the sharpened pixel data into scaled sharpened pixel data at the output resolution; and
   a transient improvement unit configured to receive the input pixel data from the single set of line buffers, sharpened pixel data at the input resolution from the linear two-dimensional sharpness enhancement unit and scaled sharpened pixel data at the output resolution from the linear two-dimensional image scaling unit, to improve transient responses at edges in the output image, and to generate output pixel data at the output resolution,
   wherein the linear two-dimensional sharpness enhancement unit, the linear two-dimensional image scaling unit and the transient improvement unit share the single set of line buffers, thereby reducing costs, complexity and power consumption of the system.

2. The image scaling system of claim 1 wherein the transient improvement unit includes a linear two-dimensional edge detector configured to detect in at least one of a horizontal and vertical direction edges from the input pixel data and to generate edge data at the input resolution.

3. The image scaling system of claim 2 wherein the transient improvement unit further includes a linear two-dimensional edge scaler configured to convert in at least one of a horizontal and vertical direction the edge data at the input resolution into scaled edge data at the output resolution.

4. The image scaling system of claim 3 wherein the linear two-dimensional edge scaler includes an edge scaling filter coefficient lookup table for storing a plurality of sets of edge scaling filter coefficients that are used to calculate an interpolated pixel value for image magnification or a decimated pixel value for image reduction based on a relative position among input pixels and output pixels.

5. The image scaling system of claim 3 wherein the transient improvement unit further includes a nonlinear transient improver configured to combine nonlinearly the scaled sharpened pixel data at the output resolution, the scaled edge data at the output resolution, the sharpened pixel data at the input resolution, and to generate an output image at the output resolution with enhanced sharpness and improved transients.

6. The image scaling system of claim 5 further comprising:
   a two-dimensional image dilation and image erosion unit configured to determine a local maximum pixel value and a local minimum pixel value among pixel values from the sharpened pixel data within a decision window.

7. The image scaling system of claim 6, wherein the nonlinear transient improver is configured to combine nonlinearly the scaled sharpened pixel data, the scaled edge data, the local maximum pixel value and the local minimum pixel value to generate the output image at the output resolution with enhanced sharpness and improved transients.

8. The image scaling system of claim 1 wherein the linear two-dimensional image scaling unit includes an image scaling filter coefficient lookup table for storing a plurality of sets of image scaling filter coefficients that are used to calculate an interpolated pixel value for image magnification or a decimated pixel value for image reduction based on the relative position among input pixels and output pixels.

9. The image scaling system of claim 3 wherein the linear two-dimensional edge detector is configured to generate the edge data based on the input pixel data.

10. The image scaling system of claim 9 wherein the linear two-dimensional edge scaler converts the edge data at the input resolution into scaled edge data at the output resolution such that the scaled edge data is substantially isotropic.

11. A method for converting an input image comprising input pixel data from an input video signal conveying a plurality of input video frames at an input resolution into an output image at an output resolution, the method comprising:
   providing a single set of line buffers;
   receiving and storing input pixel data from a scan line in an input video frame in each line buffer of the set of line buffers;
   receiving input pixel data from the single set of line buffers and sharpening in at least one of a horizontal and vertical direction the input pixel data at the input resolution;
   receiving the sharpened pixel data and converting in at least one of a horizontal and vertical direction the sharpened pixel data into scaled sharpened pixel data at the output resolution;
   receiving input pixel data from the single set of line buffers, sharpened pixel data at the input resolution, and scaled sharpened pixel data at the output resolution, improving transient responses at edges in the output image, and generating output pixel data at the output resolution, substantially in parallel with the sharpening and converting processes; and
   outputting an image at the output resolution with enhanced sharpness and improved transients,
   wherein by sharing the single set of line buffers between the pixel sharpening, the resolution converting and the transient improving processes, the costs, complexity and power consumption of the method are reduced.

12. The method of claim 11 wherein sharpening the input pixel data includes enhancing high frequency components of the input pixel data in at least one of a horizontal and vertical direction.

13. The method of claim 11 wherein improving the transient response includes:
   detecting edges from the input pixel data;
   generating edge data at the input resolution in at least one of a horizontal and vertical direction;
   converting in at least one of a horizontal and vertical direction the edge data at the input resolution into scaled edge data at the output resolution;

receiving sharpened pixel data at the input resolution corresponding to input pixels within a decision window;

identifying a local maximum pixel value and a local minimum pixel value among pixel values from the sharpened pixel data within the decision window; and combining nonlinearly the scaled sharpened pixel data, the scaled edge data, the local maximum pixel value and the local minimum pixel value to generate the output image at the output resolution with enhanced sharpness and improved transients.

14. The method of claim 11 wherein improving the transient response includes utilizing a luminance channel of the input pixel data, sharpened pixel data, and scaled sharpened pixel data to improve both of a chrominance transient response and a luminance transient response.

15. A method for generating a scaled output image with enhanced sharpness and improved transients, the method comprising:

providing a single set of line buffers;

receiving and storing input pixel data from a scan line in an input video frame in each line buffer of the set of line buffers;

receiving the input pixel data from the single set of line buffers and sharpening in at least one of a horizontal and vertical direction the input pixel data;

scaling in at least one of a horizontal and vertical direction the sharpened pixel data from an input resolution to an output resolution; and receiving the input pixel data from the single set of line buffers and improving transients in the output image substantially in parallel with the sharpening and scaling processes, wherein by performing the pixel sharpening, scaling and transients improving processes substantially in parallel, the costs, complexity and power consumption of the method are reduced.

16. A system for generating a scaled output image with enhanced sharpness and improved transients, the system comprising:

a single set of line buffers for receiving and storing input pixel data from scan lines in an input video frame;

means for sharpening in at least one of a horizontal and vertical direction the input pixel data received from the single set of line buffers;

means for scaling in at least one of a horizontal and vertical direction the sharpened pixel data from an input resolution to an output resolution; and means for improving transients in the output image from input pixel data received from the single set of line buffers, wherein the means for improving transients is configured to share the single set of line buffers with the sharpening and scaling means and to operate substantially in parallel with the sharpening and scaling means, thereby reducing the costs, complexity and power consumption of the system.

* * * * *